(12) United States Patent
Ota et al.

(10) Patent No.: US 7,770,599 B2
(45) Date of Patent: Aug. 10, 2010

(54) ACCUMULATOR

(75) Inventors: Takashi Ota, Kikukawa (JP); Tatsuhiro Arikawa, Kikukawa (JP); Kuniaki Miyake, Fujisawa (JP); Kenji Sasaki, Fujisawa (JP); Shinya Nakaoka, Fujisawa (JP); Eiji Mizutani, Kariya (JP); Noriyuki Hosoi, Kariya (JP); Tomoo Ogura, Kariya (JP)

(73) Assignees: NOK Corporation (JP); Advics Co., Ltd. (JP)

( * ) Notice: Subject to any disclaimer, the term of this patent is extended or adjusted under 35 U.S.C. 154(b) by 0 days.

(21) Appl. No.: 12/612,217

(22) Filed: Nov. 4, 2009

(65) Prior Publication Data
US 2010/0108168 A1    May 6, 2010

(30) Foreign Application Priority Data
Nov. 5, 2008   (JP)   ............................. 2008-284241

(51) Int. Cl.
*F16L 55/04* (2006.01)
(52) U.S. Cl. .............................. 138/31; 138/30; 138/26; 220/721; 303/87
(58) Field of Classification Search .................... 137/31, 137/30, 26; 138/31, 30, 26; 303/87; 220/721; 417/540
See application file for complete search history.

(56) References Cited

U.S. PATENT DOCUMENTS

| | | | | |
|---|---|---|---|---|
| 2,365,994 A | * | 12/1944 | Ashton | ........................ 138/31 |
| 4,997,009 A | * | 3/1991 | Niikura et al. | ................. 138/30 |
| 5,205,326 A | * | 4/1993 | Paley et al. | .................... 138/30 |
| 6,189,572 B1 | * | 2/2001 | Ruffer et al. | ................... 138/30 |
| 6,286,552 B1 | * | 9/2001 | Shimbori et al. | .............. 138/31 |
| 6,616,247 B2 | * | 9/2003 | Mohr | .......................... 303/87 |
| 6,622,755 B2 | * | 9/2003 | Weber | .......................... 138/30 |
| 6,644,354 B2 | * | 11/2003 | Dinkel et al. | ................... 138/30 |
| 6,666,529 B2 | * | 12/2003 | Mohr | .......................... 303/87 |
| 6,789,576 B2 | * | 9/2004 | Umetsu et al. | ................. 138/30 |
| 6,805,166 B2 | * | 10/2004 | Suzuki et al. | .................. 138/31 |
| 6,810,915 B2 | * | 11/2004 | Umetsu et al. | ................. 138/31 |
| 6,871,672 B2 | * | 3/2005 | Kurokawa et al. | ............. 138/31 |

(Continued)

FOREIGN PATENT DOCUMENTS

JP    2001-336502    12/2001

(Continued)

*Primary Examiner*—Patrick F Brinson
(74) *Attorney, Agent, or Firm*—Harness, Dickey & Pierce, P.L.C.

(57) ABSTRACT

To prevent plastic deformation of a bellows due to a pressure difference between inner and outer sides of the bellows in an outside gas type or inside gas type accumulator, a disc-like gasket is held in a floatable state to a surface close to a stay in a bellows cap by a gasket holder, so that, the disc-like gasket moves together with the bellows cap at a steady operation time, the disc-like gasket moves together with the bellows cap to contact with an end surface portion of the stay, thereby closing the liquid chamber at a zero-down time, and the bellow cap moves toward a position where liquid pressure and gas pressure balance while the disc-like gasket keeps contacting with the stay due to a difference of pressure receiving areas in both the surfaces when the liquid in the liquid chamber is thermally expanded at a zero-down time.

8 Claims, 11 Drawing Sheets

U.S. PATENT DOCUMENTS

| | | | |
|---|---|---|---|
| 6,892,765 B2 * | 5/2005 | Kamimura | 138/30 |
| 6,957,669 B2 * | 10/2005 | Suzuki et al. | 138/30 |
| 7,325,571 B2 * | 2/2008 | Shimbori et al. | 138/30 |
| 7,377,292 B2 * | 5/2008 | Mori et al. | 138/30 |
| 2001/0037834 A1 * | 11/2001 | Shimbori et al. | 138/31 |
| 2002/0180260 A1 * | 12/2002 | Mohr | 303/87 |
| 2003/0038532 A1 * | 2/2003 | Mohr | 303/1 |
| 2003/0116209 A1 * | 6/2003 | Umetsu et al. | 138/31 |
| 2004/0003854 A1 * | 1/2004 | Kamimura | 138/30 |
| 2005/0061379 A1 * | 3/2005 | Mori et al. | 138/31 |
| 2006/0037658 A1 * | 2/2006 | Shimbori et al. | 138/30 |
| 2007/0102052 A1 * | 5/2007 | Yoshihara et al. | 138/30 |
| 2009/0133768 A1 * | 5/2009 | Miyake et al. | 138/30 |

FOREIGN PATENT DOCUMENTS

| | | |
|---|---|---|
| JP | 2005-315429 | 11/2005 |
| JP | 2007-187229 | 7/2007 |

* cited by examiner

US 7,770,599 B2

ACCUMULATOR

CROSS REFERENCE TO RELATED APPLICATION

This application is based on and claims priority under 35 U.S.C. sctn. 119 with respect to Japanese Patent Application No. 2008-284241 filed on Nov. 5, 2008, the entire content of which is incorporated herein by reference.

BACKGROUND OF THE INVENTION

1. Field of the Invention

The present invention relates to an accumulator which is used as a pressure accumulating apparatus or a pulse pressure damping apparatus. The accumulator in accordance with the present invention is used, for example, in a hydraulic piping or the like in a vehicle such as a motor vehicle or the like.

2. Description of the Conventional Art

Conventionally, there has been known an accumulator structured such that a bellows is arranged in an inner portion of an accumulator housing provided with an oil port connected to a pressure piping and an internal space of the housing is comparted into a gas chamber in which high pressure gas is charged and a liquid chamber communicating with a port hole, and the accumulator includes a type that an inner peripheral side of a bellows 51 is set to a gas chamber 55 and an outer peripheral side is set to a liquid chamber 56 by fixing the other end (a fixed end) 51b of the bellows 51 in which a bellows cap 52 is attached to one end (a floating end) 51a to an end cover 54 in an upper portion of a housing 53 as shown in FIG. 10 (which is called as "inside gas type" since the gas chamber 55 is set to the inner peripheral side of the bellows 51, refer to Japanese Unexamined Patent Publication No. 2005-315429), and a type that the outer peripheral side of the bellows 51 is set to the gas chamber 55 and the inner peripheral side is set to the liquid chamber 56 by fixing the other end (the fixed end) 51b of the bellows 51 in which the bellows cap 52 is attached to one end (the floating end) 51a to an oil port 57 in a lower portion of the housing 53 as shown in FIG. 11 (which is called as "outside gas type" since the gas chamber 55 is set to the outer peripheral side of the bellows 51, refer to Japanese Unexamined Patent Publication No. 2001-336502 or Japanese Unexamined Patent Publication No. 2007-187229).

In this case, in the accumulator connected to the pressure piping of a device, liquid (oil) is discharged little by little from a port hole 58 if an operation of the device is stopped, and in the outside gas type accumulator in FIG. 11 mentioned above, the bellows 51 is constricted little by little accordingly by the charged gas pressure, a seal 59 provided in a lower surface of the bellows cap 52 comes into contact with the other member (a stay) 60 so as to come to a so-called zero-down state. Further, in this zero-down state, since a part of liquid is sealed within the liquid chamber 56 (a space between the bellows 51 and the seal 59) by the seal 59, and pressure of the sealed liquid balances with the gas pressure of the gas chamber 55, it is possible to inhibit excessive force from being applied to the bellows 51 so as to generate a plastic deformation.

However, in the case that the zero-down due to the operation stop is carried out at a low temperature, and the temperature rises in this state, the liquid sealed in the liquid chamber 56 and the charged gas are thermally expanded respectively, and the respective pressures rise. In this case, a rising rate of the pressure is higher in the liquid than the charged gas, however, since a pressure receiving area in the bellows cap 52 is set smaller than the charged gas side, the bellows cap 52 does not move until the liquid pressure becomes considerably higher than the gas pressure. Accordingly, there is a case that a great pressure difference coming to about some MPa is generated between the liquid pressure and the gas pressure in the inner and outer sides of the bellows 51, and if such the great pressure difference is generated, there is a risk that the plastic deformation is generated in the bellows 51 or the seal 59 is damaged.

SUMMARY OF THE INVENTION

Problem to be Solved by the Invention

The present invention is made by taking the points mentioned above into consideration, and an object of the present invention is to provide an outside gas type accumulator or an inside gas type accumulator in which the accumulator is provided with a structure for reducing a pressure difference generated by a difference of coefficient of thermal expansion at a time when a liquid sealed in a liquid chamber at a time of zero-down and a charged gas are thermally expanded, whereby it is possible to inhibit a plastic deformation from being generated in the bellows, by reducing a pressure difference between inner and outer sides of the bellows.

Means for Solving the Problem

In order to achieve the object mentioned above, in accordance with a first aspect of the present invention, there is provided an accumulator comprising:

an accumulator housing provided with an oil port connected to a pressure piping;

a stay arranged in an inner side of the oil port in the accumulator housing and provided with a liquid inlet-and-outlet in an end surface portion in a top end of a tubular portion;

a bellows arranged in an outer peripheral side of the stay and coupled to the oil port by its fixed end;

a bellows cap coupled to a floating end of the bellows;

a gasket holder provided in a surface close to the stay in the bellows cap; and a disc-like gasket held in a state of being relatively movable in an expanding and contracting direction of the bellows by the gasket holder, wherein a gas chamber is set at an outer peripheral side of the bellows and a liquid chamber is set at an inner peripheral side of the bellows, and wherein the disc-like gasket moves together with the bellows cap at a time of a steady operation, the disc-like gasket moves together with the bellows cap so as to come into contact with an end surface portion of the stay, thereby closing the liquid chamber, at a time of zero-down of the pressure piping, and the bellows cap is movable toward a position where liquid pressure and gas pressure are balanced, while the disc-like gasket keeps in contact with the stay on the basis of a difference of pressure receiving areas in both the surfaces, when the liquid sealed in the liquid chamber is thermally expanded at a time of zero-down.

Further, in accordance with a second aspect of the present invention, there is provided an accumulator comprising:

an accumulator housing provided with an oil port connected to a pressure piping;

a stay arranged in an inner side of the oil port in the accumulator housing and provided with a liquid inlet-and-outlet in an end surface portion in a top end of a tubular portion;

a bellows coupled to a position in an opposite side to the oil port in the accumulator housing by its fixed end;

a bellows cap coupled to a floating end of the bellows;

a gasket holder provided in a surface close to the stay in the bellows cap; and a disc-like gasket held in a state of being relatively movable in an expanding and contracting direction of the bellows by the gasket holder, wherein a gas chamber is set at an inner peripheral side of the bellows and a liquid chamber is set at an outer peripheral side of the bellows, and wherein the disc-like gasket moves together with the bellows cap at a time of a steady operation, the disc-like gasket moves together with the bellows cap so as to come into contact with an end surface portion of the stay, thereby closing the liquid chamber, at a time of zero-down of the pressure piping, and the bellows cap is movable toward a position where liquid pressure and gas pressure are balanced, while the disc-like gasket keeps in contact with the stay on the basis of a difference of pressure receiving areas in both the surfaces, when the liquid sealed in the liquid chamber is thermally expanded at a time of zero-down.

Further, in accordance with a third aspect of the present invention, there is provided an accumulator as recited in the first or second aspect, wherein a spring means elastically energizing the disc-like gasket in a direction to press it to the bellow cap is interposed between the gasket holder and the disc-like gasket, and the bellows cap moves to the position where the liquid pressure and the gas pressure are balanced while compressing the spring means, in a state in which the disc-like gasket keeps in contact with the stay on the basis of the difference of the pressure receiving areas in both the surfaces, when the liquid sealed in the liquid chamber is thermally expanded at a time of zero-down.

Further, in accordance with a fourth aspect of the present invention, there is provided an accumulator as recited in the first, second or third aspect, wherein the disc-like gasket is structured such that an elastic body is attached to a surface of a rigid plate, and by the elastic body, there are formed a seal portion coming into contact with an end surface portion of the stay in a manner of being movable to contact therewith and away therefrom so as to close the liquid chamber, and a spacer portion coming into contact with the bellows cap in a manner of being movable to contact therewith and away therefrom and setting a gap between the gasket and the bellows cap.

In the accumulator in accordance with the first aspect of the present invention having the structure mentioned above, since the bellows cap is coupled to the floating end of the bellows as well as the fixed end of the bellows is coupled to the oil port, and the liquid chamber is set at the inner peripheral side of the bellows as well as the gas chamber is set at the outer peripheral side of the bellows, the accumulator is the accumulator of "outside gas type". Further, the accumulator is connected to the pressure piping and operates as follows.

Steady Operation Time:

Since the disc-like gasket stays away from the end surface portion of the stay by moving together with the bellows cap in a state in which the disc-like gasket is held to the gasket holder, the fluid inlet-and-outlet provided in the end surface portion of the stay is opened, whereby the oil port and the liquid chamber (the bellows inner peripheral space) communicate via the fluid inlet-and-outlet. Accordingly, since the liquid provided with the pressure each time is introduced as needed from the oil port to the liquid chamber, the bellows cap moves as needed together with the gasket in such a manner that the liquid pressure balances with the charged gas pressure.

Zero-Down Time:

If the pressure of the pressure piping comes to the zero-down state on the basis of the stop of the operation of the device or the like, the liquid within the liquid chamber is discharged little by little from the oil port, the bellows is contracted by the charged gas pressure in accordance with this, and the bellows cap moves in a bellows contracting direction. Since the disc-like gasket is held to the stay side of the bellows cap, the disc-like gasket comes into contact with the end surface portion of the stay, and the fluid inlet and outlet is closed. Accordingly, since the liquid chamber (the bellows inner peripheral space) is closed, and a part of liquid is sealed in the liquid chamber, no further pressure reduction is generated in the liquid chamber, whereby there comes to a state in which the liquid pressure and the charged gas pressure are balanced in the inner and outer sides of the bellows.

Thermal Expansion Time in Zero-Down State:

If the liquid sealed in the liquid chamber and the charged gas are thermally expanded due to rise of the temperature of the ambient atmosphere or the like, in the zero-down state, that is, the state in which the disc-like gasket comes into contact with the end surface portion of the stay, and the liquid chamber (the bellows inner peripheral space) is closed, the pressure difference is generated since the rising degree of the pressure is higher in the liquid than the gas. However, in the present invention, the bellows cap moves toward the position where the liquid pressure and the charged gas pressure are balanced on the basis of the application of the pressure difference. Therefore, since the liquid pressure and the charged gas pressure always come to the balanced state, it is possible to prevent the plastic deformation in the bellows from being generated by the pressure difference between the inner and outer sides of the bellows.

In this case, the pressure receiving area of the disc-like gasket is set larger in the surface close to the bellows cap than in the surface close to the stay, in the state of coming into contact with the end surface portion of the stay. Accordingly, at the thermally expanding time, the disc-like gasket does not move while keeping in contact with the end surface portion of the stay on the basis of the difference of the pressure receiving area in both the surfaces. Accordingly, the fluid inlet-and-outlet provided in the end surface portion of the stay is kept closed. Since the disc-like gasket is held to the gasket holder in the floatable state, a relative displacement of the bellows cap and the disc-like gasket mentioned above is allowed.

Zero-Down Cancelled Time:

If the zero-down state is canceled and the liquid flows from the oil port, the pressure of the liquid acts on the disc-like gasket and moves the disc-like gasket away from the end surface portion of the stay. Since the liquid is continuously introduced to the liquid chamber (the gasket inner peripheral space), the liquid directly acts on the bellows cap, and moves the bellows cap to the position where the liquid pressure and the charged gas pressure are balanced. Accordingly, the accumulator is returned to an initial state (a state at the steady operation time).

Next, in the accumulator in accordance with the second aspect of the present invention having the structure mentioned above, since the bellows cap is coupled to the floating end of the bellows as wall as the fixed end of the bellows is coupled to the position in the opposed side to the oil port in the accumulator housing, and the liquid chamber is set at the outer peripheral side of the bellows as well as the gas chamber is set at the inner peripheral side of the bellows, the accumulator is the accumulator of "inside gas type". Further, the accumulator is connected to the pressure piping, and operates as follows.

Steady Operation Time:

Since the disc-like gasket stays away from the end surface portion of the stay by moving together with the bellows cap in a state in which the disc-like gasket is supported to the gasket holder, the fluid inlet-and-outlet provided in the end surface portion of the stay is opened, whereby the oil port and the liquid chamber (the bellows outer peripheral space) communicate via the fluid inlet-and-outlet. Accordingly, since the liquid provided with the pressure each time is introduced as needed from the oil port to the liquid chamber, the bellows cap moves as needed together with the gasket in such a manner that the liquid pressure balances with the charged gas pressure.

Zero-Down Time:

If the pressure of the pressure piping comes to the zero-down state on the basis of the stop of the operation of the device or the like, the liquid within the liquid chamber is discharged little by little from the oil port, the bellows is expanded by the charged gas pressure in accordance with this, and the bellows cap moves in a bellows expansion direction. Since the disc-like gasket is held to the stay side of the bellows cap, the disc-like gasket comes into contact with the end surface portion of the stay, and the fluid inlet-and-outlet is closed. Accordingly, since the liquid chamber (the bellows outer peripheral space) is closed, and apart of liquid is sealed in the liquid chamber, no further pressure reduction is generated in the liquid chamber, whereby there comes to a state in which the liquid pressure and the charged gas pressure are balanced in the inner and outer sides of the bellows.

Thermal Expansion Time in Zero-Down State:

If the liquid sealed in the liquid chamber and the charged gas are thermally expanded due to the rise of the temperature of the ambient atmosphere or the like, in the zero-down state, that is, the state in which the disc-like gasket comes into contact with the end surface portion of the stay, and the liquid chamber (the bellows outer peripheral space) is closed, the pressure difference is generated since the rising degree of the pressure is higher in the liquid than the gas. However, in the present invention, the bellows cap moves toward the position where the liquid pressure and the charged gas pressure are balanced on the basis of the application of the pressure difference. Therefore, since the liquid pressure and the charged gas pressure always come to the balanced state, it is possible to prevent the plastic deformation in the bellows from being generated by the pressure difference between the inner and outer sides of the bellows.

In this case, the pressure receiving area of the disc-like gasket is set larger in the surface close to the bellows cap than in the surface close to the stay, in the state of coming into contact with the end surface portion of the stay. Accordingly, at the thermally expanding time, the disc-like gasket does not move while keeping in contact with the end surface portion of the stay on the basis of the difference of the pressure receiving areas in both the surfaces. Accordingly, the fluid inlet-and-outlet provided in the end surface portion of the stay is kept closed. Since the disc-like gasket is held to the gasket holder in the floatable state, a relative displacement of the bellows cap and the disc-like gasket mentioned above is allowed.

Zero-Down Cancelled Time:

If the zero-down state is canceled and the liquid flows from the oil port, the pressure of the liquid acts on the disc-like gasket and moves the disc-like gasket away from the end surface portion of the stay. Since the liquid is continuously introduced to the liquid chamber (the gasket outer peripheral space), the liquid directly acts on the bellows cap, and moves the bellows cap to the position where the liquid pressure and the charged gas pressure are balanced. Accordingly, the accumulator is returned to an initial state (a state at the steady operation time).

In this case, as a matter which is common in the accumulator in accordance with the first aspect and the accumulator in accordance with the second aspect, if a spring means is employed elastically energizing the disc-like gasket in a direction to press it to the bellows cap, between the gasket holder and the disc-like gasket, at a time of canceling the zero-down, the disc-like gasket follows quickly to the movement of the bellows cap. Accordingly, the operation at a time of canceling the zero-down is smoothened.

In this case, since the spring means should not obstruct the relative displacement between the bellows cap and the disc-like gasket at a time of the thermal expansion, spring force thereof is set comparatively small. Accordingly, when the liquid sealed in the liquid chamber is thermally expanded at a time of zero-down, the bellows cap moves to the position where the liquid pressure and the gas pressure are balanced while compressing the spring means, in the state in which the disc-like gasket comes into contact with the stay on the basis of the difference of the pressure receiving areas in both the surfaces.

Further, since the disc-like gasket is held to the gasket holder in the floatable state, and comes into contact with the end surface portion of the stay so as to achieve a sealing operation, it is preferable that it does not deform so much even if the pressure is applied. Accordingly, the disc-like gasket is structured such that an elastic body is attached to a surface of a rigid plate, and the gasket is made to be hardly deformed as a whole by using a rigid plate as a core member. A seal portion coming into contact with the end surface portion of the stay in a manner of being movable to contact therewith and away therefrom so as to close the liquid chamber is formed by an elastic body on one surface of the rigid plate. Since the seal portion constructed by the elastic body is excellent in an adhesion property, it securely seals the liquid chamber at a time of zero-down. A spacer portion coming into contact with the bellows cap in a manner of being movable to contact therewith and away therefrom and setting a gap between the gasket and the bellows cap is formed by an elastic body on the other surface of the rigid plate. If the spacer portion is formed and the gap is set as mentioned above, the liquid easily makes an intrusion into a portion between the disc-like gasket and the bellows cap, at a time of the thermal expansion.

Effect of the Invention

As mentioned above, in accordance with the present invention, it is possible to reduce the pressure difference generated when the liquid sealed in the liquid chamber and the charged gas are thermally expanded at a time of zero-down, on the basis of the movement of only the bellows cap without the movement of the disc-like gasket, in the outside gas type accumulator or the inside gas type accumulator. Accordingly, it is possible to inhibit the plastic deformation from being generated in the bellows on the basis of the pressure difference between the inner and outer sides of the bellows, whereby it is possible to improve a durability of the bellows and consequently the accumulator.

In the case that the spring means elastically energizing the disc-like gasket in the direction of pressing the gasket to the bellows cap is interposed between the gasket holder and the disc-like gasket, the disc-like gasket quickly follows to the movement of the bellows cap at a time of canceling the zero-down. Accordingly, it is possible to smoothen the operation at a time of canceling the zero-down.

In the case that the rigid plate is used as the core member of the disc-like gasket, the gasket is made to be unlikely deformed, it is possible to enhance the sealing performance by forming the seal portion constructed by the elastic body, and the liquid easily makes an intrusion into the portion between the disc-like gasket and the bellows cap, at a time of thermal expansion by forming the space portion.

BRIEF EXPLANATION OF THE DRAWINGS

FIGS. 5A and 5B are single part views of a disc-like gasket, in which FIG. 5A is a plan view thereof and FIG. 5B is a sectional view thereof;

DETAILED DESCRIPTION OF PREFERRED EMBODIMENTS

Figure 1:
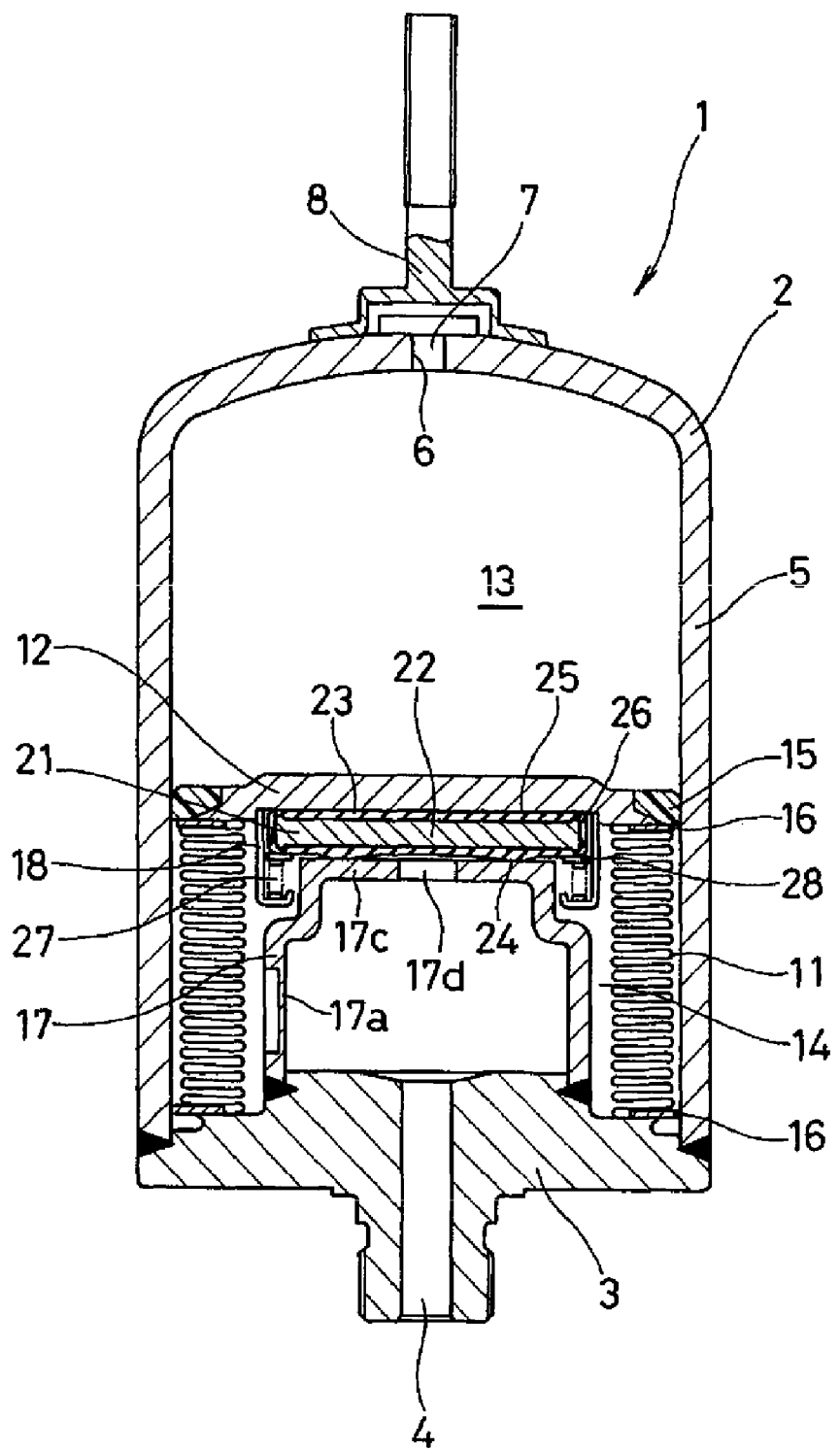
FIG. 1 is a sectional view of an accumulator in accordance with a first embodiment of the present invention.

The present invention includes the following embodiments.

(1) The present invention relates to a metal bellows type accumulator in which gas is sealed outside a bellows.

(2) In an accumulator structured such that an inner side of a cylindrical shell is comparted into two chambers by a metal bellows, the gas is sealed in an outer side of the bellows, and a liquid flows into and out of an inner side of the bellows, one end opening of the expanding and contracting cylindrical bellows is fixed by welding to the shell, and on the other hand, an opening at the other end of the bellows is welded to a bellows cap so as to be closed.

(3) If the liquid flows out and the bellows contracts, an oil port having a liquid outflow inlet comes into contact with the bellows cap, however, in order to prevent the bellows from being deformed in the case that liquid pressure is widely reduced in comparison with gas pressure, a means for sealing the liquid outflow inlet of the oil port is provided.

(4) In a state of sealing between the oil port and the bellows cap (in a zero-down state), the liquid sealed in the inner side of the bellows is thermally expanded, for example, by a temperature rise of the whole of the accumulator, thereby its pressure being increased (less than the gas pressure), and there is a problem of generating such a deformation (abnormal deformation) that adjacent peaks are closely attached to each other by expanding the peaks at an outer peripheral side of the bellows, and then troughs at an inner peripheral side contract.

(5) Therefore, in accordance with the present invention, in the metal bellows type accumulator, the sealing means of the liquid outflow inlet is constructed by a disc-like gasket which is engaged within a holder fixed to the bellows cap in a freely floatable state.

(6) The disc-like gasket has an annular seal portion surrounding the liquid outflow inlet in a surface close to the oil port, and has a concave portion having a wider area than an inner diameter area of the annular seal portion in a surface close to the bellows cap.

(7) As a collateral structure, a spring energizing lightly to the bellows cap side is provided between the disc-like gasket and the holder.

(8) In accordance with the structure mentioned above, when the liquid sealed in the inner side of the bellows is thermally expanded in a state in which the disc-like gasket seals between the oil port and the bellows cap, the bellows cap comes away from the disc-like gasket to a position where the gas pressure balances with the liquid pressure sealed in the inner side of the bellows, in a state in which the disc-like gasket keeps sealing the liquid outflow inlet of the oil port. Accordingly, since the gas pressure always balances with the liquid pressure sealed in the inner side of the bellows, it is possible to prevent the bellows from being deformed by the pressure rise of the liquid enclosed in the inner side of the bellows.

(9) Further, in the case that the spring mentioned above is provided collaterally, the disc-like gasket is energized by the spring when the liquid flows in from the state in which the disc-like gasket seals the liquid outflow inlet of the oil port and the bellows is elongated, and the disc-like gasket can quickly follow to the bellows cap.

Embodiments

Next, a description will be given of embodiments in accordance with the present invention with reference to the accompanying drawings.

First Embodiment ("Outside Gas Type" Accumulator in Accordance with First Aspect)

Figure 2:
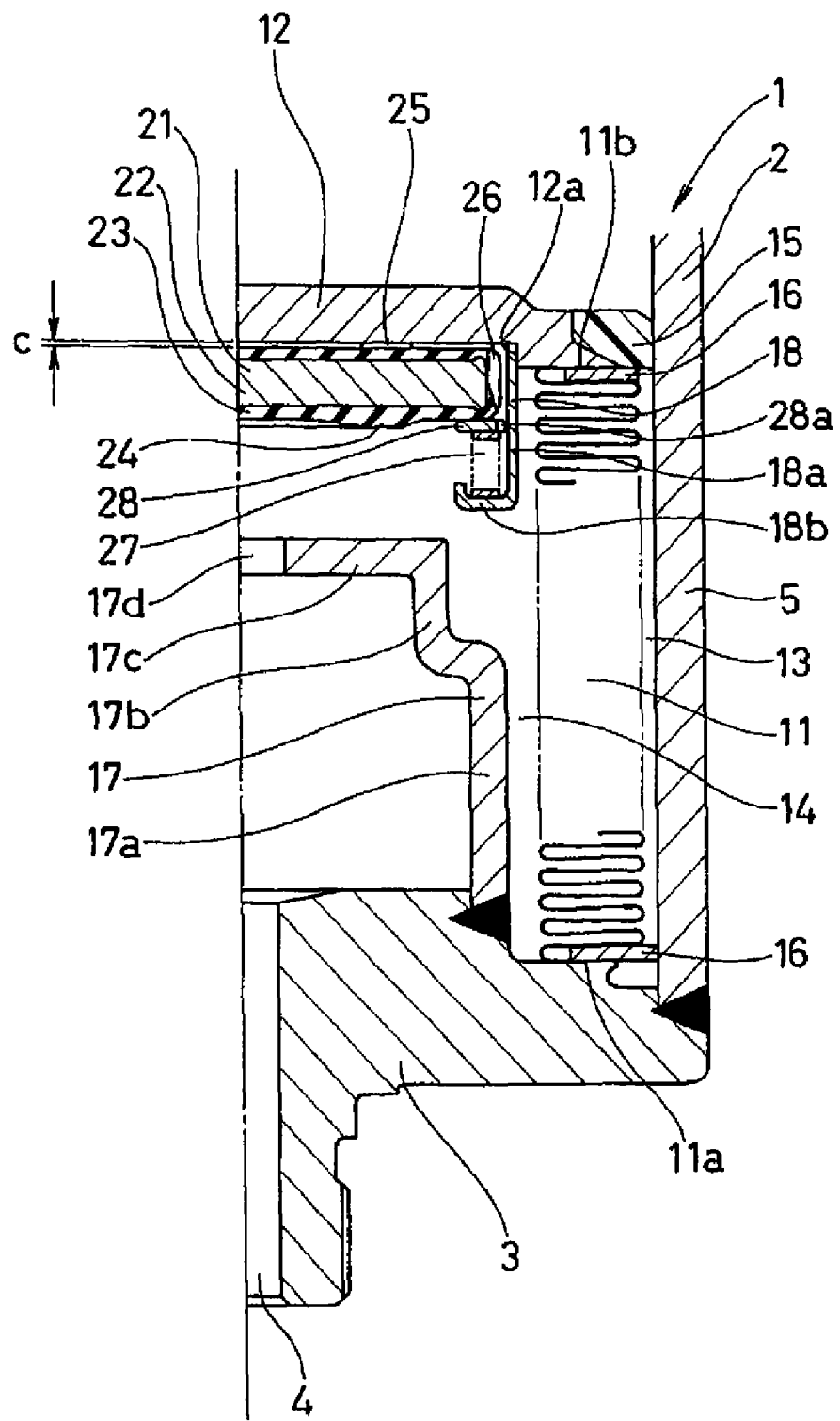
FIG. 2 is a substantial part enlarged sectional view showing a state at a steady operation time of the accumulator.
Figure 3:
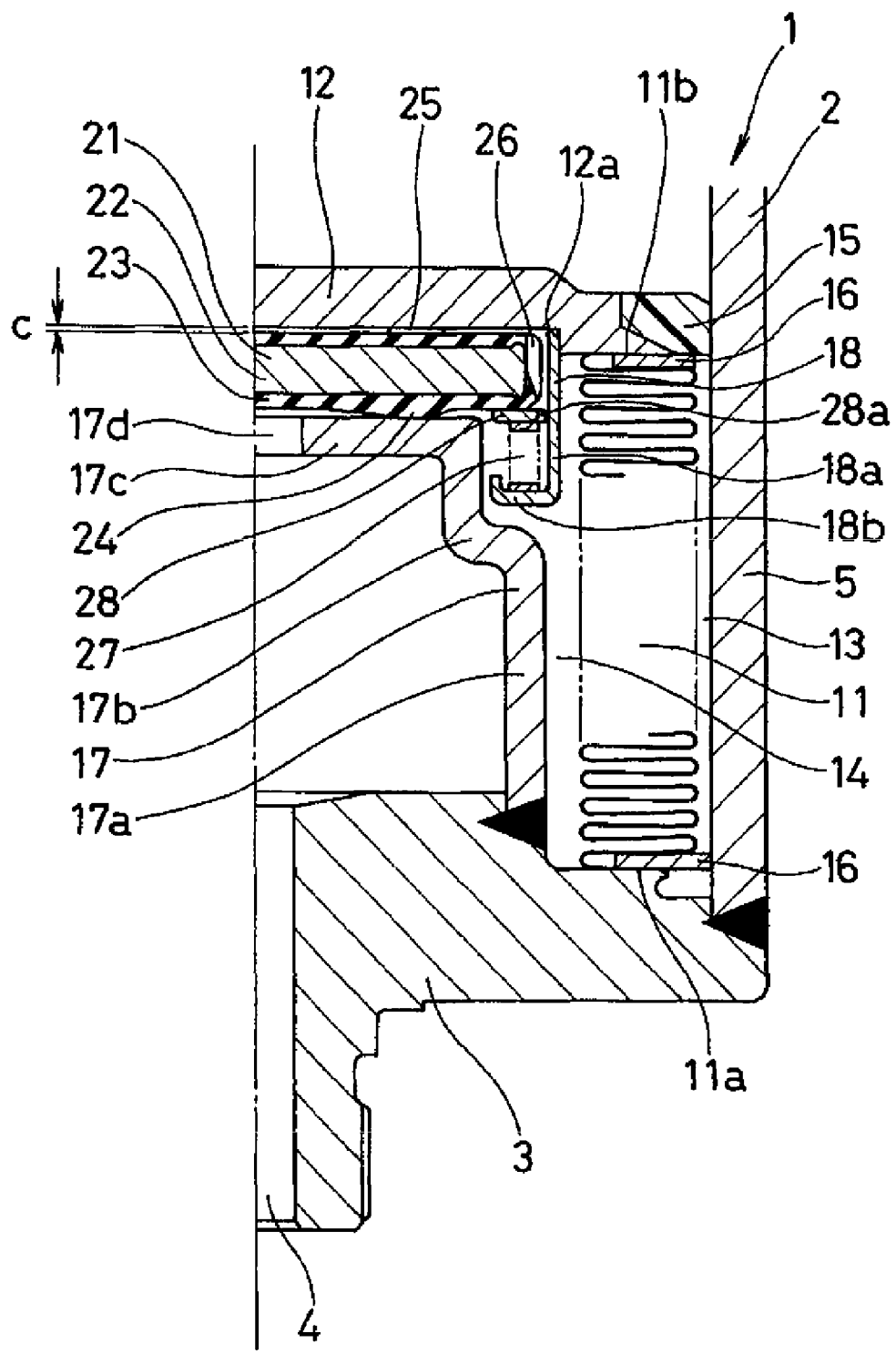
FIG. 3 is a substantial part enlarged sectional view showing a state at a zero-down time of the accumulator.
Figure 4:
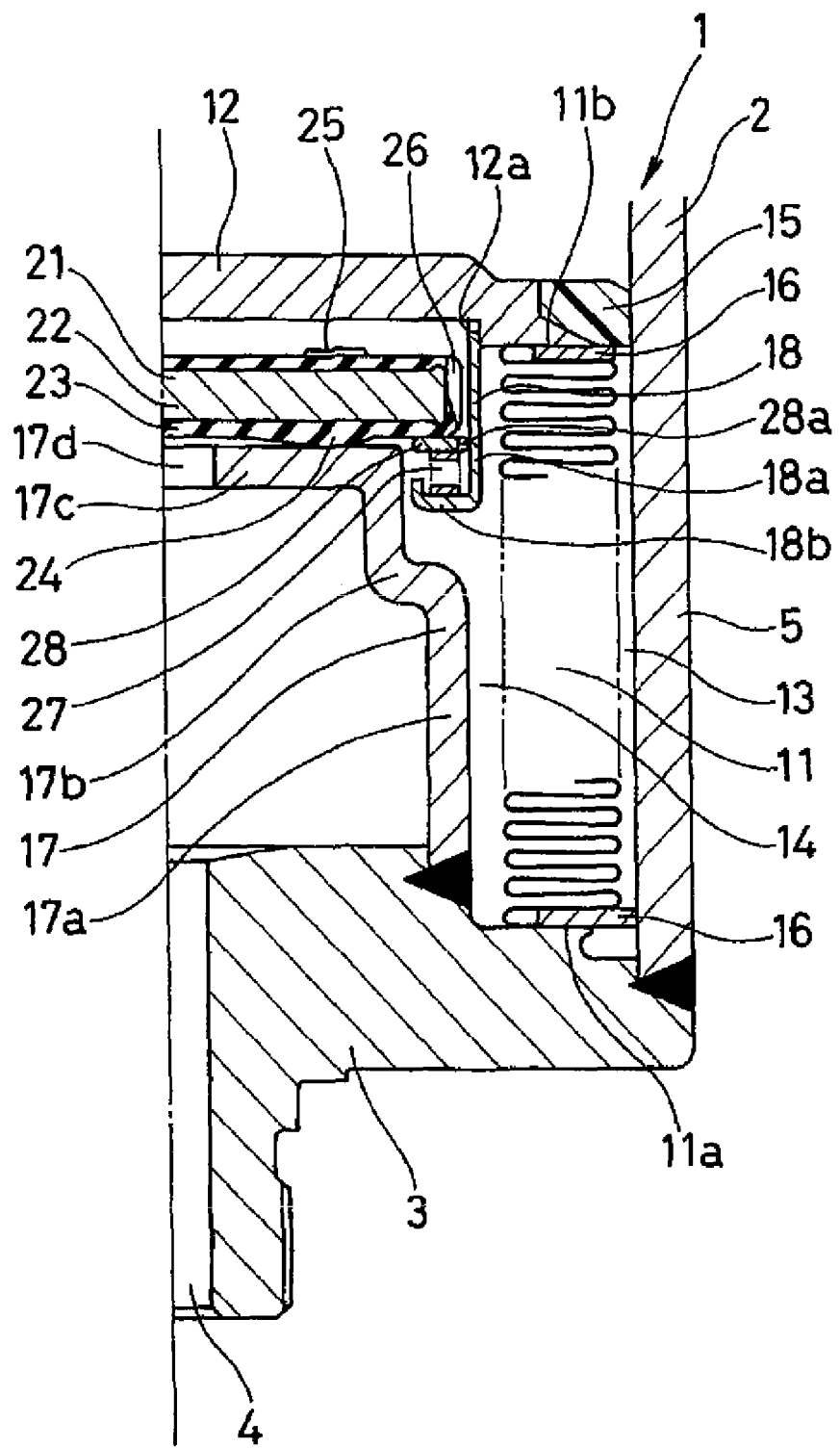
FIG. 4 is a substantial part enlarged sectional view showing a state at a thermal expansion time in a zero-down state of the accumulator.
Figure 5A:
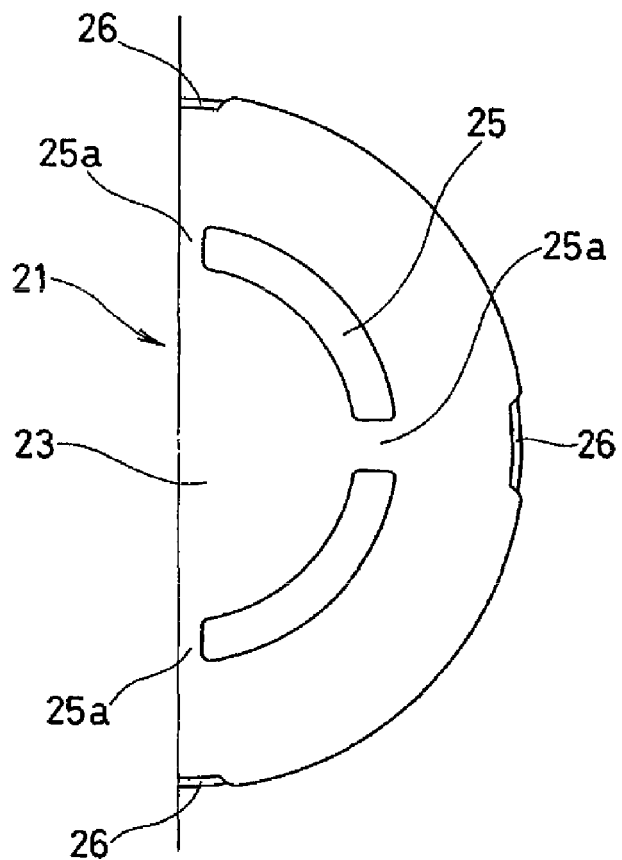
Figure 5B:
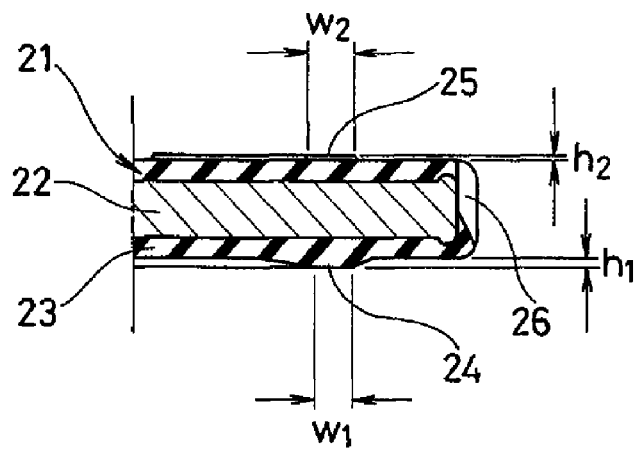

FIG. 1 shows a whole section of an accumulator 1 in accordance with a first embodiment of the present invention. FIGS. 2 to 4 show a substantial part enlarged sectional view of the accumulator 1. FIGS. 5A and 5B show single part views of a disc-like gasket 21. As a state of operation in each of the figures, FIG. 2 shows a state at a steady operation time, FIGS. 1 and 3 show a state at a zero-down time, and FIG. 4 shows a state at a thermally expanding time in a zero-down state, respectively.

The accumulator 1 in accordance with the embodiment is a metal bellows type accumulator using a metal bellows as a bellows 11, and is structured as follows.

It is provided with an accumulator housing 2 having an oil port 3 connected to a pressure piping (not shown), the bellows 11 and a bellows cap 12 are arranged in an inner portion of the housing 2, and an internal space of the housing 2 is comparted into a gas chamber 13 charging high pressure gas (for example, nitrogen gas) and a liquid chamber 14 communicating with a port hole 4 of the oil port 3. As the housing 2, there is described a housing constructed by a combination of a closed-end cylindrical shell 5, and the oil port 3 fixed (welded) to an opening portion of the shell 5, however, a parts layout structure of the housing 2 is not particularly limited. For example, the oil port 3 and the shell 5 may be integrally formed, a bottom portion of the shell 5 may be constructed by an end cover which is independent from the shell 5, and in any case, the bottom portion of the shell 5 or a corresponding part is provided with a gas filler port 6 for filling the gas in the gas chamber 13, and is closed by a gas plug 7 after the gas is filled. Reference numeral 8 denotes a pin with hexagonal nut.

As shown in FIG. 2, the bellows 11 is structured such that a fixed end 11a thereof is fixed (welded) to an inner surface of the oil port 3 corresponding to a port side inner surface of the housing 2 and a disc-like bellows cap 12 is fixed (welded) to a floating end 11b thereof. Accordingly, the accumulator 1 is constructed as an "outside gas type" accumulator in which the gas chamber 13 is set at an outer peripheral side of the bellows 11, and a liquid chamber 14 is arranged at an inner peripheral side of the bellows 11. A vibration damping ring 15 is attached to an outer peripheral portion of the bellows cap 12 for preventing the bellows 11 and the bellows cap 12 from coming into contact with the inner surface of the housing 2, however, the vibration damping ring 15 does not achieve a sealing operation. Reference numeral 16 denotes a protection ring.

A stay (an internal pedestal) 17 is arranged in an inner surface of the oil port 3, and the bellows 11 is arranged in an outer peripheral side of the stay 17. The stay 17 is structured such that a step portion 17b and an end surface portion 17c are integrally formed toward an inner side in a radial direction in one end of a tubular portion 17a, and is fixed (welded) to the inner surface of the oil port 3 by the other end of the tubular portion 17a. A fluid inlet-and-outlet 17d is provided in the center of the end surface portion 17c.

A gasket holder 18 is fixed to a surface close to the stay 17 in the bellows cap 12. The gasket holder 18 is structured such that a flange portion 18b is integrally formed toward an inner side in a radial direction in one end of a tubular portion 18a, and is fixed (fitted) to a peripheral edge portion of a concave portion 12a provided in the surface close to the stay 17 in the bellows cap 12 by the other end of the tubular portion 18a.

A disc-like gasket 21 is held in a floatable state to an inner peripheral side of the gasket holder 18. In this case, being held in the floatable state means a matter that the disc-like gasket 21 is held in a state in which it can be displaced in an axial direction (an expanding and contracting direction of the bellows 11) with respect to the gasket holder 18 and the bellows cap 12 fixing it thereto. Since the disc-like gasket 21 is engaged with the flange portion 18b of the gasket holder 18 so as to be prevented from coming off, it can be displaced in an axial direction between the flange portion 18b and the bellows cap 12.

Further, the disc-like gasket 21 is structured, as shown in FIG. 5, such that an elastic body 23 made of a rubber or the like is attached to a surface of a disc-like rigid plate 22 made of a metal, a hard resin or the like, a seal portion 24 coming into contact with the end surface portion 17c of the stay 17 in a manner of being movable to contact therewith and away therefrom, and closing the liquid chamber (the bellows inner peripheral space) 14 is formed in a surface close to the stay 17 in the gasket 21, by the elastic body 23 attached to the surface, and a spacer portion 25 coming into contact with the bellows cap 12 in a manner of being movable to contact therewith and away therefrom, and setting a gap c between the gasket 21 and the bellows cap 12 is formed in a surface close to the bellows cap 12. The gap c is set between the gasket 21 and the bellows cap 12 by the latter spacer portion 25, for making the liquid easily make an intrusion into a portion between the gasket 21 and the bellows cap 12 when the liquid is thermally expanded at a zero-down time (if the spacer portion 25 is not provided, the gasket 21 and the bellows cap 12 come to a closely attached state at a time of zero-down, and the liquid is hard to make an intrusion into the portion between the both 12 and 21 when the liquid is thermally expanded, due to the closely attached state. Accordingly, such an operation that only the bellows cap 12 moves in a state in which the gasket 21 keeps in contact with the end surface portion 17c of the stay 17 is hard to be generated). Further, a desired number of notch portions 26 are provided in an outer peripheral portion of the gasket 21 in order to make the liquid easily pass between the gasket 21 and the gasket holder 18.

Since the seal portion 24 is formed as an annular projection having a predetermined height h1 and a radial width w1, and is formed in an annular shape, it achieves a sealing operation so as to close the liquid chamber (the bellows inner peripheral space) 14 at a time of coming into contact with the end surface portion 17c of the stay 17. On the other hand, the spacer portion is formed as an annular projection having a predetermined height h2 and a radial width w2, however, is provided with a desired number of notch portions 25a in parts on a circumference. Accordingly, since it is not formed in a completed annular shape, it does not achieve a sealing operation even if it comes into contact with the bellows cap 12. Therefore, in a state in which the disc-like gasket 21 comes into contact with the end surface portion 17c of the stay 17 by the seal portion 24, a pressure receiving area of the surface close to the bellows cap 12 in the disc-like gasket 21 is set larger than a pressure receiving area of the surface close to the stay 17.

Further, a wave spring 27 serving as a spring means elastically energizing the disc-like gasket 21 in a direction of pressing it to the bellows cap 12 is interposed between the flange portion 18b of the gasket holder 18 and the disc-like gasket 21. Reference numeral 28 denotes a spring plate (a washer), and a desired number of notch portions 28a are provided in an outer peripheral portion of the spring plate 28 in order to make the liquid easily pass through the portion between the spring plate 28 and the gasket holder 18.

Next, a description will be given of an operation of the accumulator 1 having the structure mentioned above.

At a Time of Steady Operation:

As mentioned above, FIG. 2 shows a state at a time of a steady operation of the accumulator 1. The oil port 3 is connected to a pressure piping of a device (not shown). At a time of this steady operation, since the disc-like gasket 21 stays away from the end surface portion 17c of the stay 17 by moving together with the bellows cap 12 in a state of being held to the gasket holder 18, the fluid inlet-and-outlet 17d provided in the end surface portion 17c of the stay 17 is open. Accordingly, since the port hole 4 of the oil port 3 and the liquid chamber (the bellows inner peripheral space) 14 communicates through the fluid inlet-and-outlet 17d, and the liquid provided with a pressure each time is introduced as needed to the liquid chamber 14 from the port hole 4 of the oil port 3, the bellows cap 12 can move as needed together with the disc-like gasket 21 in such a manner that the liquid pressure and the charged gas pressure balance.

At a Time of Zero-Down:

If the pressure of the pressure piping comes to the zero-down state on the basis of the stop of the operation of the device or the like from the state in FIG. 2, the liquid within the liquid chamber 14 is discharged little by little from the port hole 4 of the oil port 3, the bellows 11 is contracted little by little by the charged gas pressure as shown in FIGS. 1 and 3 in accordance with this, and the bellows cap 12 is moved in a contracting direction of the bellows 11. Since the disc-like gasket 21 is held to the surface close to the stay 17 in the bellows cap 12, the disc-like gasket 21 comes into contact with end surface portion 17c of the stay 17 by the seal portion 24 thereof, and the fluid inlet-and-out let 17d is closed. Accordingly, since the liquid chamber (the bellows inner peripheral space) 14 is closed and a part of liquid is sealed in the liquid chamber 14, any further pressure reduction is not generated in the liquid chamber 14, so that the liquid pressure balances with the charged gas pressure inside and outside the bellows 11. Therefore, it is possible to prevent the bellows 11 from being damaged.

At a Time of Thermal Expansion in Zero-Down State:

If the liquid sealed in the liquid chamber 14 and the charged gas are thermally expanded due to an increase of an ambient temperature or the like in a zero-down state shown in FIGS. 1 and 3, that is, in a state in which the disc-like gasket 21 comes into contact with the end surface portion 17c of the stay 17 and the liquid chamber (the bellows inner peripheral space) 14 is closed, the pressure difference is generated since a rising degree of the pressure is greater in the liquid than in the charged gas. Then, as shown in FIG. 4, the bellows cap 12 moves to a position where the liquid pressure and the charged gas pressure are balanced while compressing the wave spring 27 on the basis of the application of the pressure difference. Accordingly, since the liquid pressure and the charged gas pressure always come to the balanced state, it is possible to inhibit a plastic deformation (an abnormal deformation) from being generated in the bellows 11 on the basis of the pressure difference inside and outside the bellows 11. In addition, at a time of the thermal expansion, the disc-like gasket 21 keeps in contact with the end surface portion 17c of the stay 17 and does not move due to the difference of the pressure receiving area in both the surfaces. Accordingly, the fluid inlet-and-outlet 17d is kept closed.

At a Time of Canceling Zero-Down:

If the zero-down state is canceled and the liquid flows in from the port hole 4 of the oil port 3, the pressure of the liquid acts on the disc-like gasket 21 so as to move the disc-like gasket 21 away from the end surface 17c of the stay 17. Since the liquid is continuously introduced to the liquid chamber (the gasket inner peripheral space) 14 from the fluid inlet-and-outlet 17d, it directly acts on the bellows cap 12, and moves the bellows cap 12 to a position where the liquid pressure and the charged gas pressure are balanced. Accordingly, it returns to an initial state.

In addition, at this time, since the wave spring 27 is provided as a spring means elastically energizing the disc-like gasket 21 in a direction pressing it to the bellows cap 12, between the gasket holder 18 and the disc-like gasket 21, the disc-like gasket 21 quickly follows to the movement of the bellows cap 12. Accordingly, the operation at a time of canceling the zero-down is smoothened.

In accordance with the accumulator 1 having the structure mentioned above, it is possible to reduce the pressure difference generated on the basis of the difference of the coefficient of thermal expansion when the liquid sealed in the liquid chamber 14 and the charged gas are thermally expanded at a time of the zero-down, by the movement of only the bellows cap 12 without the movement of the disc-like gasket 21, in the "outside gas type" accumulator. Accordingly, it is possible to inhibit the plastic deformation (the abnormal deformation) from being generated in the bellows 11 on the basis of the pressure difference inside and outside the bellows 11, whereby it is possible to improve a durability of the bellows 11 and consequently the accumulator 1.

Further, since the wave spring 27 is provided as the spring means elastically energizing the disc-like gasket 21 in the direction pressing it to the bellows cap 12 between the gasket holder 18 and the disc-like gasket 21, the disc-like gasket 21 quickly follows to the movement of the bellows cap 12. Therefore, it is possible to smoothen the operation at a time of canceling the zero-down.

Further, since the rigid plate 22 is used as the core member of the disc-like gasket 21, the gasket 21 is structured such as to be hardly deformed as a whole. Since the seal portion 24 constructed by the elastic body 23 is formed in the gasket 21, it is possible to enhance a sealing performance, and since the spacer portion 25 is formed, the liquid easily makes an intrusion into the portion between the gasket 21 and the bellows cap 12, at a time of the thermal expansion.

Second Embodiment ("Inside Gas Type" Accumulator in Accordance with Second Aspect)

Figure 6:
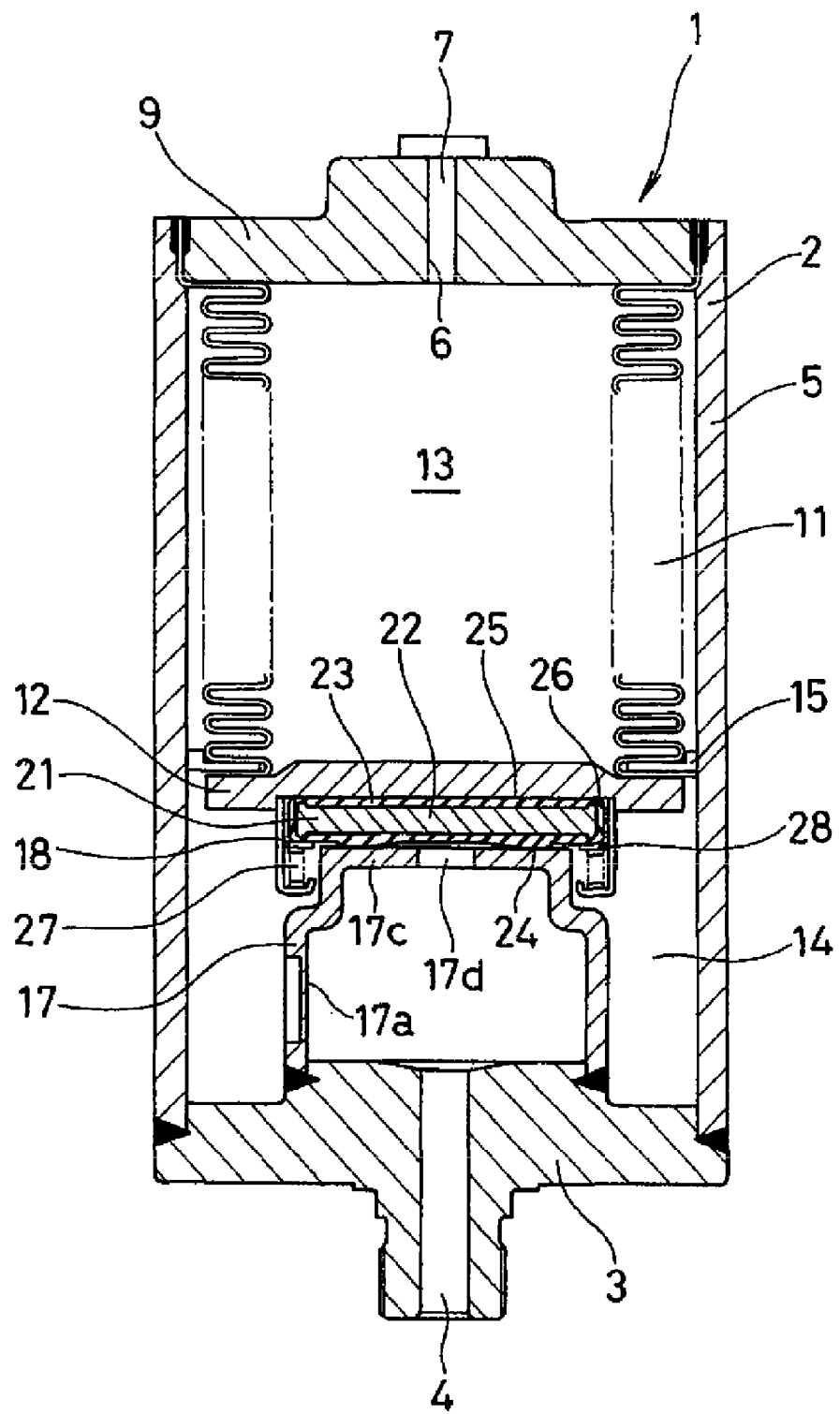
FIG. 6 is a sectional view of an accumulator in accordance with a second embodiment of the present invention.
Figure 7:
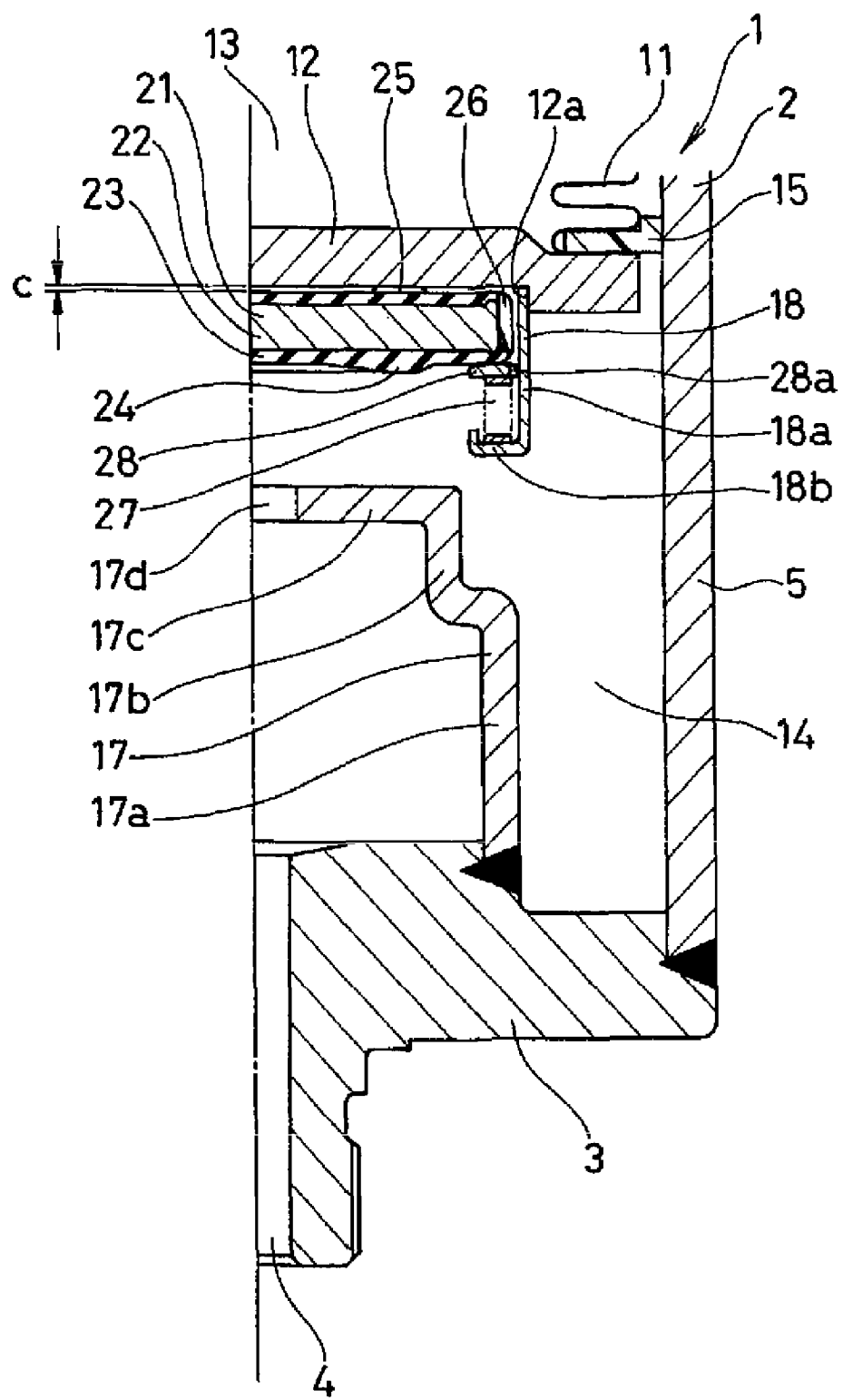
FIG. 7 is a substantial part enlarged sectional view showing a state at a steady operation time of the accumulator.
Figure 8:
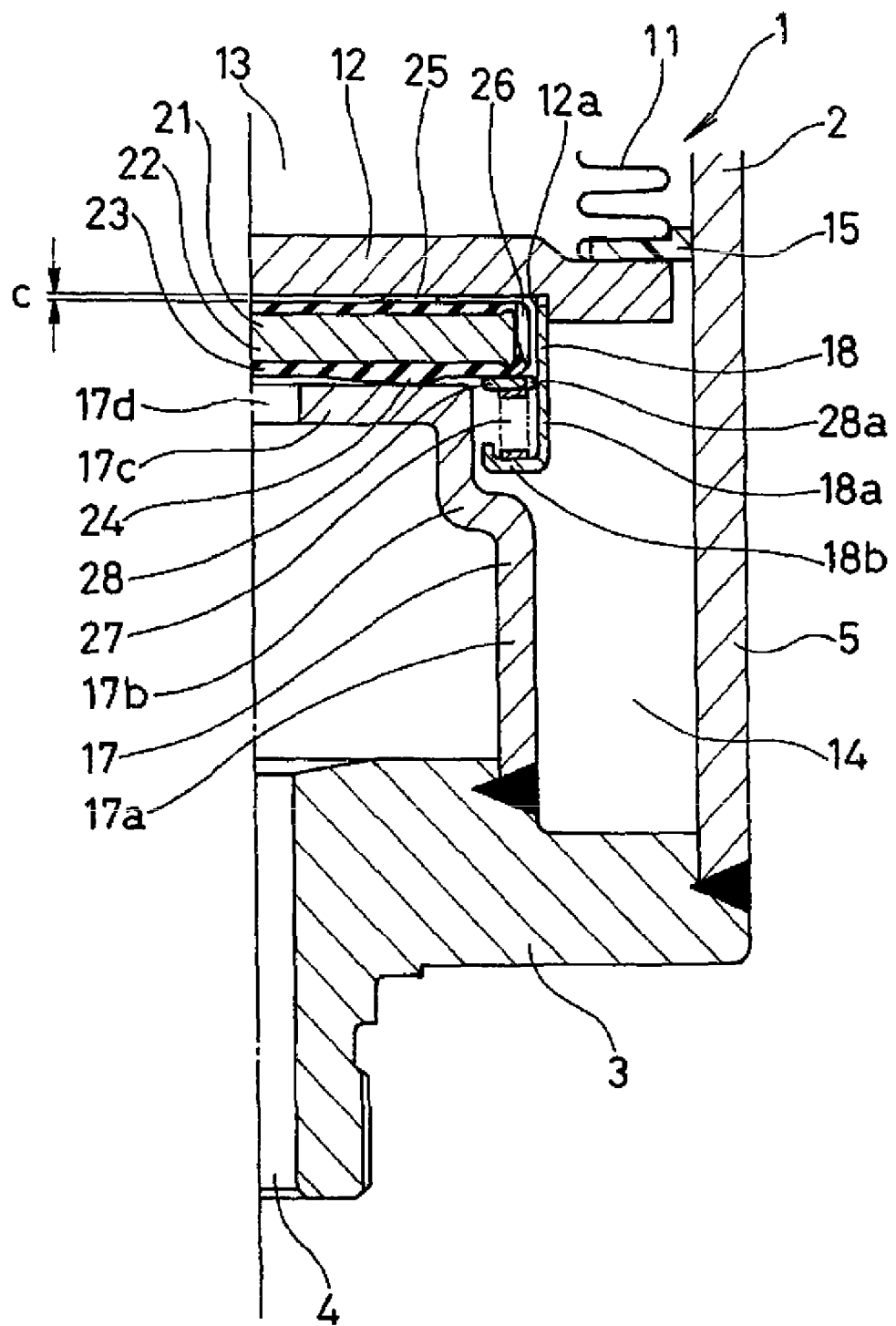
FIG. 8 is a substantial part enlarged sectional view showing a state at a zero-down time of the accumulator.
Figure 9:
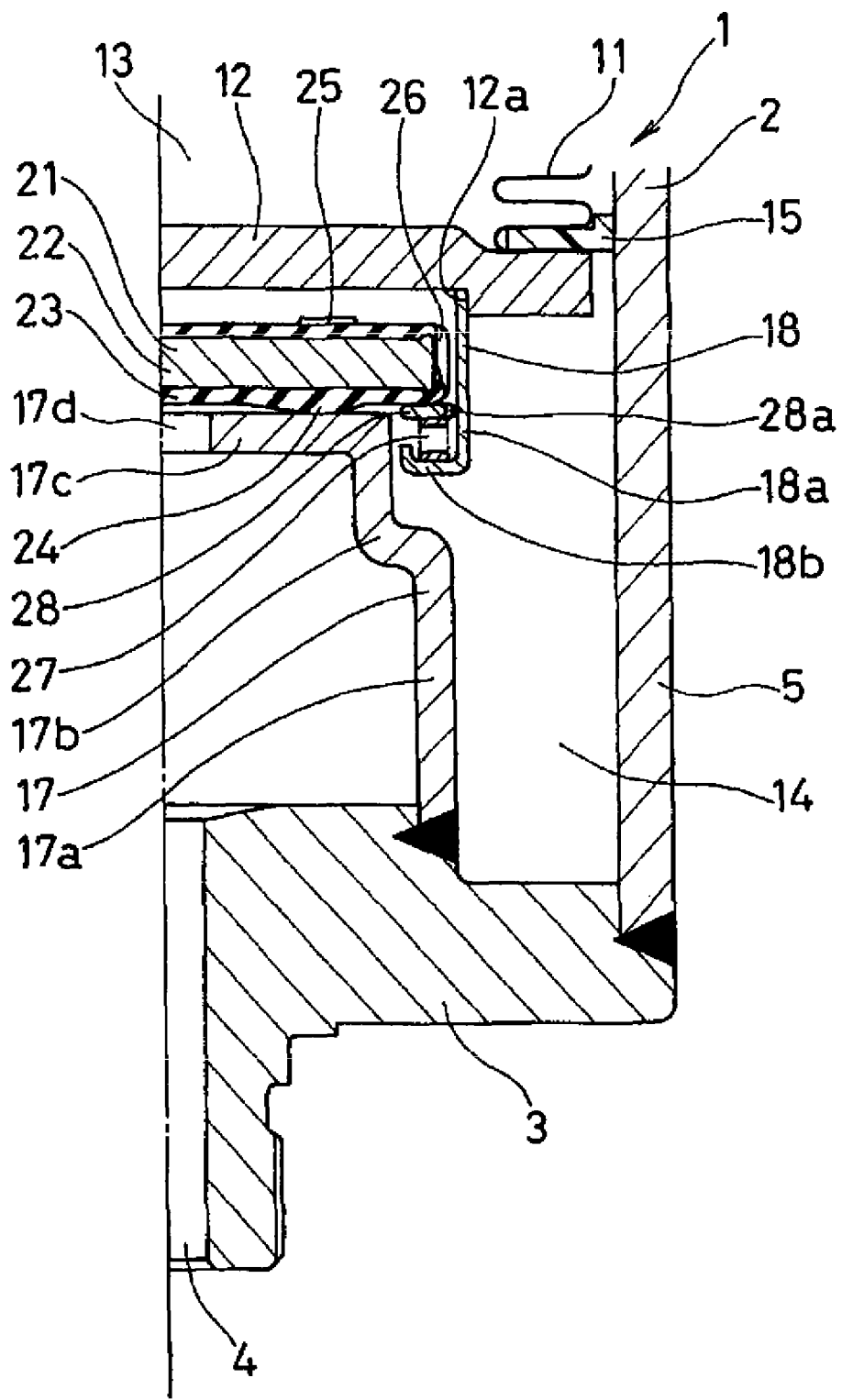
FIG. 9 is a substantial part enlarged sectional view showing a state at a thermal expansion time in a zero-down state of the accumulator.
Figure 10:
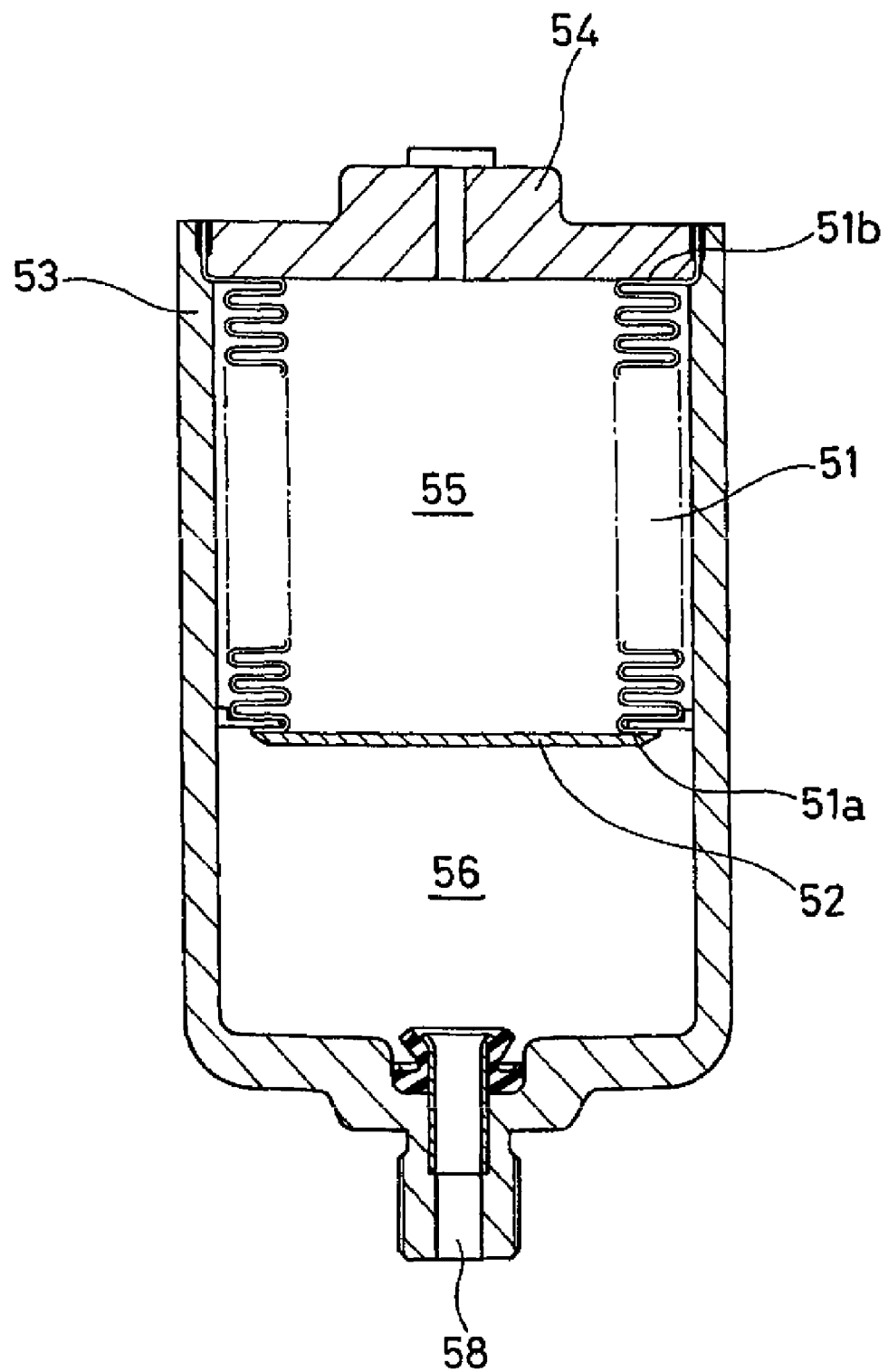
FIG. 10 is a sectional view of an accumulator in accordance with a conventional example.
Figure 11:
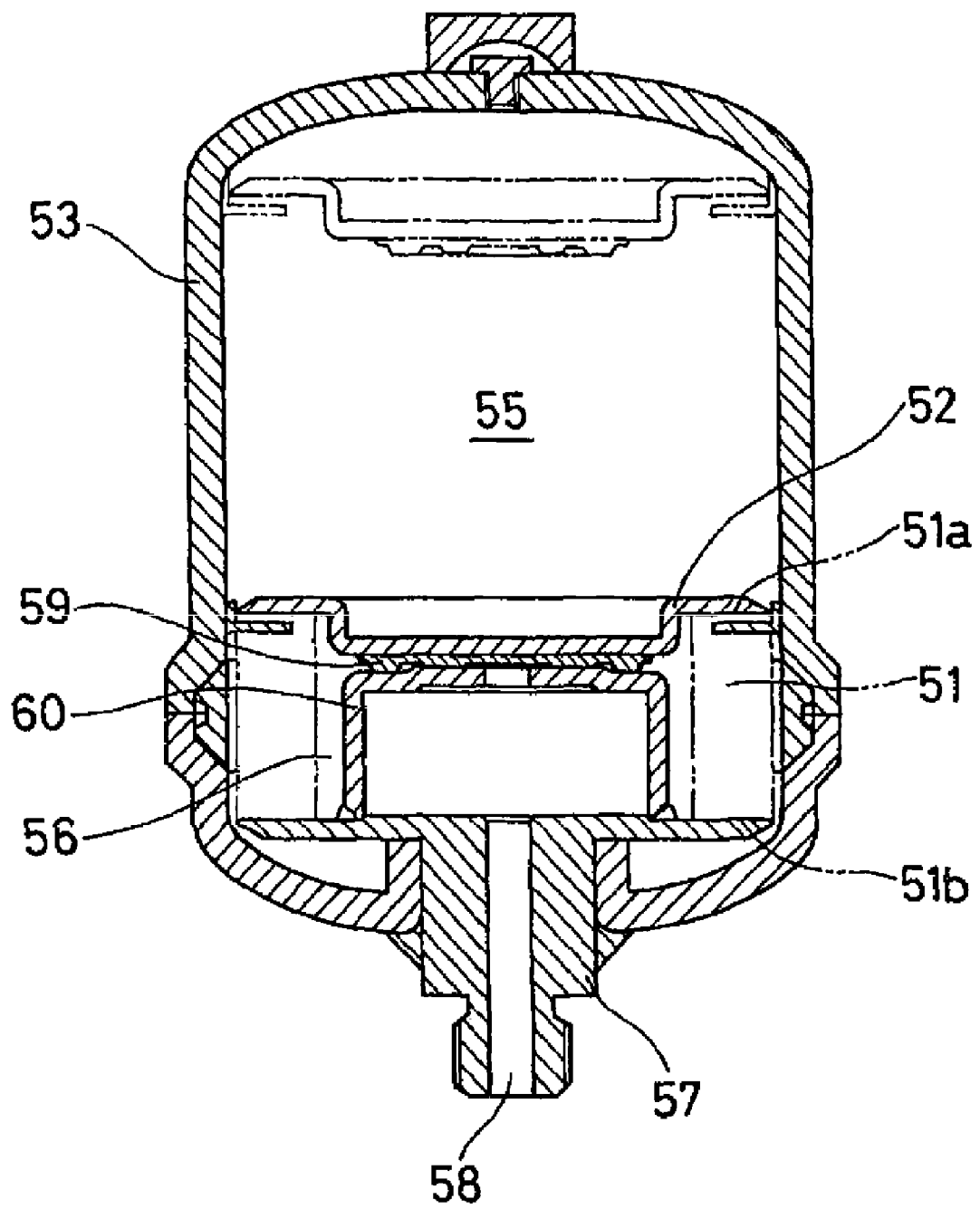
FIG. 11 is a sectional view of an accumulator in accordance with another conventional example.

FIG. 6 shows a whole section of an accumulator 1 in accordance with a second embodiment of the present invention. FIGS. 7 to 9 show a substantial part enlarged sectional view of the accumulator 1. As a state of operation in each of the figures, FIG. 7 shows a state at a steady operation time, FIGS. 6 and 8 show a state at a zero-down time, and FIG. 9 shows a state at a thermally expanding time in a zero-down state, respectively.

The accumulator 1 in accordance with the embodiment is a metal bellows type accumulator using a metal bellows as a bellows 11, and is structured as follows.

It is provided with an accumulator housing 2 having an oil port 3 connected to a pressure piping (not shown), the bellows 11 and a bellows cap 12 are arranged in an inner portion of the housing 2, and an internal space of the housing 2 is comparted into a gas chamber 13 charging high pressure gas (for example, nitrogen gas) and a liquid chamber 14 communicating with a port hole 4 of the oil port 3. As the housing 2, there is described a housing constructed by a combination of a cylindrical shell 5, the oil port 3 fixed (welded) to an opening portion in one end of the shell 5, and an end cover 9 fixed (welded) to an opening portion in the other end of the shell 5, however, a parts layout structure of the housing 2 is not particularly limited. For example, the oil port 3 and the shell 5 may be integrally formed, the end cover 9 and the shell 5 may be integrally formed, and in any case, the end cover 9 or a corresponding part thereto is provided with a gas filler port 6 for filling the gas in the gas chamber 13, and is closed by a gas plug 7 after the gas is filled.

The bellows 11 is structured such that a fixed end thereof is fixed (welded) to an inner surface of the end cover 9 corresponding to an inner surface in an opposed side to a port side of the housing 2 and a disc-like bellows cap 12 is fixed (welded) to a floating end thereof. Accordingly, the accumulator 1 is constructed as an "inside gas type" accumulator in which the gas chamber 13 is set at an inner peripheral side of the bellows 11, and a liquid chamber 14 is arranged at an outer peripheral side of the bellows 11. A vibration damping ring 15 is attached to an outer peripheral portion of the bellows cap 12 for preventing the bellows 11 and the bellows cap 12 from coming into contact with the inner surface of the housing 2, however, the vibration damping ring 15 does not achieve a sealing operation.

A stay (an internal pedestal) 17 is arranged in an inner surface of the oil port 3. As shown in FIG. 7, the stay 17 is structured such that a step portion 17b and an end surface portion 17c are integrally formed toward an inner side in a radial direction in one end of a tubular portion 17a, and is fixed (welded) to the inner surface of the oil port 3 by the other end of the tubular portion 17a. A fluid inlet-and-outlet 17d is provided in the center of the end surface portion 17c.

A gasket holder 18 is fixed to a surface close to the stay 17 in the bellows cap 12. The gasket holder is structured such that a flange portion 18b is integrally formed toward an inner side in a radial direction in one end of a tubular portion 18a, and is fixed (fitted) to a peripheral edge portion of a concave portion 12a provided in the surface close to the stay 17 in the bellows cap 12 by the other end of the tubular portion 18a.

A disc-like gasket 21 is held in a floatable state to an inner peripheral side of the gasket holder 18. In this case, being held in the floatable state means a matter that the disc-like gasket 21 is held in a state in which it can be displaced in an axial direction (an expanding and contracting direction of the bellows 11) with respect to the gasket holder 18 and the bellows cap 12 fixing it thereto. Since the disc-like gasket 21 is engaged with the flange portion 18b of the gasket holder 18 so as to be prevented from coming off, it can be displaced in an axial direction between the flange portion 18b and the bellows cap 12.

Further, the disc-like gasket 21 is structured, as shown in FIG. 5 in accordance with the first embodiment mentioned above, such that an elastic body 23 made of a rubber or the like is attached to a surface of a disc-like rigid plate 22 made of a metal, a hard resin or the like, a seal portion 24 coming into contact with the end surface portion 17c of the stay 17 in a manner of being movable to contact thereto and away therefrom, and closing the liquid chamber (the bellows outer peripheral space) 14 is formed in a surface close to the stay 17 in the gasket 21, by the elastic body 23 attached to the surface, and a spacer portion 25 coming into contact with the bellows cap 12 in a manner of being movable to contact therewith and away therefrom, and setting a gap c between the gasket 21 and the bellows cap 12 is formed in a surface close to the bellows cap 12. The gap c is set between the gasket 21 and the bellows cap 12 by the latter spacer portion 25, for making the liquid easily make an intrusion into a portion between the gasket 21 and the bellows cap 12 when the liquid is thermally expanded at a zero-down time (if the spacer portion 25 is not provided, the gasket 21 and the bellows cap 12 come to a closely attached state at a time of zero-down, and the liquid is hard to make an intrusion into the portion between the both 12 and 21 when the liquid is thermally expanded, due to the closely attached state. Accordingly, such an operation that only the bellows cap 12 moves in a state in which the gasket 21 keeps in contact with the end surface portion 17c of the stay 17 is hard to be generated). Further, a desired number of notch portions 26 are provided in an outer peripheral portion of the gasket 21 in order to make the liquid easily pass between the gasket 21 and the gasket holder 18.

Since the seal portion 24 is formed as an annular projection having a predetermined height h1 and a radial width w1, and is formed in an annular shape, it achieves a sealing operation so as to close the liquid chamber (the bellows outer peripheral space) 14 at a time of coming into contact with the end surface portion 17c of the stay 17. On the other hand, the spacer portion is formed as an annular projection having a predetermined height h2 and a radial width w2, however, is provided with a desired number of notch portions 25a in parts on a circumference. Accordingly, since it is not formed in a complete annular shape, it does not achieve a sealing operation even if it comes into contact with the bellows cap 12. Therefore, in a state in which the disc-like gasket 21 comes into contact with the end surface portion 17c of the stay 17 by the seal portion 24, a pressure receiving area of the surface close to the bellows cap 12 in the disc-like gasket 21 is set larger than a pressure receiving area of the surface close to the stay 17.

Further, a wave spring 27 serving as a spring means elastically energizing the disc-like gasket 21 in a direction of pressing it to the bellows cap 12 is interposed between the flange portion 18b of the gasket holder 18 and the disc-like gasket 21. Reference numeral 28 denotes a spring plate (a washer), and a desired number of notch portions 28a are provided in an outer peripheral portion of the spring plate 28 in order to make the liquid easily pass through the portion between the spring plate 28 and the gasket holder 18.

Next, a description will be given of an operation of the accumulator 1 having the structure mentioned above.

At a Time of Steady Operation:

As mentioned above, FIG. 7 shows a state at a time of a steady operation of the accumulator 1. The oil port 3 is connected to a pressure piping of a device (not shown). At a time of this steady operation, since the disc-like gasket 21 stays away from the end surface portion 17c of the stay 17 by moving together with the bellows cap 12 in a state of being held to the gasket holder 18, the fluid inlet-and-outlet 17d provided in the end surface portion 17c of the stay 17 is open. Accordingly, since the port hole 4 of the oil port 3 and the liquid chamber (the bellows outer peripheral space) 14 communicates through the fluid inlet-and-outlet 17d, and the liquid provided with pressure each time is introduced as needed to the liquid chamber 14 from the port hole 4 of the oil port 3, the bellows cap 12 can move as needed together with the disc-like gasket 21 in such a manner that the liquid pressure and the charged gas pressure balance.

At a Time of Zero-Down:

If the pressure of the pressure piping comes to the zero-down state on the basis of the stop of the operation of the device or the like from the state in FIG. 7, the liquid within the liquid chamber 14 is discharged little by little from the port hole 4 of the oil port 3, the bellows 11 is expanded by the charged gas pressure as shown in FIGS. 6 and 8 in accordance with this, and the bellows cap 12 is moved in an expanding direction of the bellows 11. Since the disc-like gasket 21 is held to the surface close to the stay 17 in the bellows cap 12, the disc-like gasket 21 comes into contact with end surface portion 17c of the stay by the seal portion 24 thereof, and the fluid inlet-and-outlet 17d is closed. Accordingly, since the liquid chamber (the bellows outer peripheral space) 14 is closed and a part of liquid is sealed in the liquid chamber 14, any further pressure reduction is not generated in the liquid chamber 14, so that the liquid pressure balances with the charged gas pressure inside and outside the bellows 11. Therefore, it is possible to prevent the bellows 11 from being damaged.

At a Time of Thermal Expansion in Zero-Down State:

If the liquid sealed in the liquid chamber 14 and the charged gas are thermally expanded due to an increase of an ambient temperature or the like in a zero-down state shown in FIGS. 6 and 8, that is, in a state in which the disc-like gasket 21 comes into contact with the end surface portion 17c of the stay 17 and the liquid chamber (the bellows outer peripheral space)

14 is closed, the pressure difference is generated since a rising degree of the pressure is greater in the liquid than in the charged gas. Then, as shown in FIG. 9, the bellows cap 12 moves to a position where the liquid pressure and the charged gas pressure are balanced while compressing the wave spring 27 on the basis of the application of the pressure difference. Accordingly, since the liquid pressure and the charged gas pressure always come to the balanced state, it is possible to inhibit a plastic deformation (an abnormal deformation) from being generated in the bellows 11 on the basis of the pressure difference inside and outside the bellows 11. In addition, at a time of the thermal expansion, the disc-like gasket 21 keeps in contact with the end surface portion 17c of the stay 17 and does not move due to the difference of the pressure receiving area in both the surfaces. Accordingly, the fluid inlet-and-outlet 17d is kept closed.

At a Time of Canceling Zero-Down:

If the zero-down state is canceled and the liquid flows in from the port hole 4 of the oil port 3, the pressure of the liquid acts on the disc-like gasket 21 so as to move the disc-like gasket 21 away from the end surface 17c of the stay 17. Since the liquid is continuously introduced to the liquid chamber (the gasket outer peripheral space) 14 from the fluid inlet-and-outlet 17d, it directly acts on the bellows cap 12, and moves the bellows cap 12 to a position where the liquid pressure and the charged gas pressure are balanced. Accordingly, it returns to an initial state.

In addition, at this time, since the wave spring 27 is provided as a spring means elastically energizing the disc-like gasket 21 in a direction pressing it to the bellows cap 12, between the gasket holder 18 and the disc-like gasket 21, the disc-like gasket 21 quickly follows to the movement of the bellows cap 12. Accordingly, the operation at a time of canceling the zero-down is smoothened.

In accordance with the accumulator 1 having the structure mentioned above, it is possible to reduce the pressure difference generated on the basis of the difference of the coefficient of thermal expansion when the liquid sealed in the liquid chamber 14 and the charged gas are thermally expanded at a time of the zero-down, by the movement of only the bellows cap 12 without the movement of the disc-like gasket 21, in the "inside gas type" accumulator. Accordingly, it is possible to inhibit the plastic deformation (the abnormal deformation) from being generated in the bellows 11 on the basis of the pressure difference inside and outside the bellows 11, whereby it is possible to improve a durability of the bellows 11 and consequently the accumulator 1.

Further, since the wave spring 27 is provided as the spring means elastically energizing the disc-like gasket 21 in the direction pressing it to the bellows cap 12 between the gasket holder 18 and the disc-like gasket 21, the disc-like gasket 21 quickly follows to the movement of the bellows cap 12. Therefore, it is possible to smoothen the operation at a time of canceling the zero-down.

Further, since the rigid plate 22 is used as the core member of the disc-like gasket 21, the gasket 21 is structured such as to be hardly deformed as a whole. Since the seal portion 24 constructed by the elastic body 23 is formed in the gasket 21, it is possible to enhance a sealing performance, and since the spacer portion 25 is formed, the liquid easily makes an intrusion into the portion between the gasket 21 and the bellows cap 12, at a time of the thermal expansion.

What is claimed is:

1. An accumulator comprising:
an accumulator housing provided with an oil port connected to a pressure piping;
a stay arranged in an inner side of said oil port in said accumulator housing and provided with a liquid inlet-and-outlet in an end surface portion in a top end of a tubular portion of the stay;
a bellows arranged in an outer peripheral side of said stay and coupled to said oil port by its fixed end;
a bellows cap coupled to a floating end of said bellows;
a gasket holder provided on a surface of said bellows cap close to the stay; and
a disc-like gasket held in a state of being relatively movable in an expanding and contracting direction of said bellows by said gasket holder, said disc-like gasket having a first surface close to said bellows cap and a second surface close to said stay,
wherein a gas chamber is set at an outer peripheral side of said bellows and a liquid chamber is set at an inner peripheral side of said bellows, and
wherein said disc-like gasket moves together with the bellows cap at a time of a steady operation, said disc-like gasket moves together with the bellows cap so as to come into contact with said end surface portion of the stay, thereby closing the liquid chamber at a time when the liquid within the liquid chamber is discharged from the oil port, and said bellows cap is movable toward a position where liquid pressure and gas pressure are balanced, while said disc-like gasket keeps in contact with the stay on the basis of a difference of pressure receiving areas in the first and second surfaces of said disc-like gasket, when the liquid sealed in the liquid chamber is thermally expanded at a time when the liquid within the liquid chamber is discharged from the oil port.

2. An accumulator comprising:
an accumulator housing provided with an oil port connected to a pressure piping;
a stay arranged in an inner side of said oil port in said accumulator housing and provided with a liquid inlet-and-outlet in an end surface portion in a top end of a tubular portion of the stay;
a bellows coupled to a position in an opposite side to said oil port in said accumulator housing by its fixed end;
a bellows cap coupled to a floating end of said bellows;
a gasket holder provided on a surface of said bellows cap close to the stay; and
a disc-like gasket held in a state of being relatively movable in an expanding and contracting direction of said bellows by said gasket holder, said disc-like gasket having a first surface close to said bellows cap and a second surface close to said stay,
wherein a gas chamber is set at an inner peripheral side of said bellows and a liquid chamber is set at an outer peripheral side of said bellows, and
wherein said disc-like gasket moves together with the bellows cap at a time of a steady operation, said disc-like gasket moves together with the bellows cap so as to come into contact with said end surface portion of the stay, thereby closing the liquid chamber, at a time when the liquid within the liquid chamber is discharged from the oil port, and said bellows cap is movable toward a position where liquid pressure and gas pressure are balanced, while said disc-like gasket keeps in contact with the stay on the basis of a difference of pressure receiving areas in the first and second surfaces of said disc-like gasket, when the liquid sealed in the liquid chamber is thermally expanded at a time when the liquid within the liquid chamber is discharged from the oil port.

3. An accumulator as claimed in claim 1, wherein a spring means elastically energizing said disc-like gasket in a direction to press it to the bellows cap is interposed between the gasket holder and the disc-like gasket, and said bellows cap moves to the position where the liquid pressure and the gas pressure are balanced while compressing said spring means, in a state in which said disc-like gasket keeps in contact with the stay on the basis of the difference of the pressure receiving areas in the first and second surfaces of said disc-like gasket, when the liquid sealed in the liquid chamber is thermally expanded at a time when the liquid with the liquid chamber is discharged from the oil port.

4. An accumulator as claimed in claim 2, wherein a spring means elastically energizing said disc-like gasket in a direction to press it to the bellows cap is interposed between the gasket holder and the disc-like gasket, and said bellows cap moves to the position where the liquid pressure and the gas pressure are balanced while compressing said spring means, in a state in which said disc-like gasket keeps in contact with the stay on the basis of the difference of the pressure receiving areas in the first and second surfaces of said disc-like gasket, when the liquid sealed in the liquid chamber is thermally expanded at a time when the liquid within the liquid chamber is discharged from the oil port.

5. An accumulator as claimed in claim 1, wherein the disc-like gasket is structured such that an elastic body is attached to a surface of a rigid plate, and by said elastic body, there are formed a seal portion coming into contact with said end surface portion of the stay in a manner of being movable to contact therewith and away therefrom so as to close the liquid chamber, and a spacer portion coming into contact with the bellows cap in a manner of being movable to contact therewith and away therefrom and setting a gap between said gasket and the bellows cap.

6. An accumulator as claimed in claim 2, wherein the disc-like gasket is structured such that an elastic body is attached to a surface of a rigid plate, and by said elastic body, there are formed a seal portion coming into contact with said end surface portion of the stay in a manner of being movable to contact therewith and away therefrom so as to close the liquid chamber, and a spacer portion coming into contact with the bellows cap in a manner of being movable to contact therewith and away therefrom and setting a gap between said gasket and the bellows cap.

7. An accumulator as claimed in claim 3, wherein the disc-like gasket is structured such that an elastic body is attached to a surface of a rigid plate, and by said elastic body, there are formed a seal portion coming into contact with said end surface portion of the stay in a manner of being movable to contact therewith and away therefrom so as to close the liquid chamber, and a spacer portion coming into contact with the bellows cap in a manner of being movable to contact therewith and away therefrom and setting a gap between said gasket and the bellows cap.

8. An accumulator as claimed in claim 4, wherein the disc-like gasket is structured such that an elastic body is attached to a surface of a rigid plate, and by said elastic body, there are formed a seal portion coming into contact with said end surface portion of the stay in a manner of being movable to contact therewith and away therefrom so as to close the liquid chamber, and a spacer portion coming into contact with the bellows cap in a manner of being movable to contact therewith and away therefrom and setting a gap between said gasket and the bellows cap.

\* \* \* \* \*